June 9, 1936.  A. LARSEN ET AL  2,043,896
BARREL JACK
Filed July 15, 1935
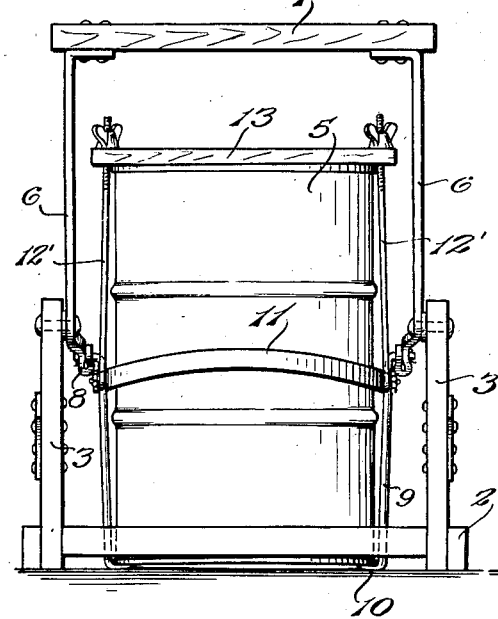
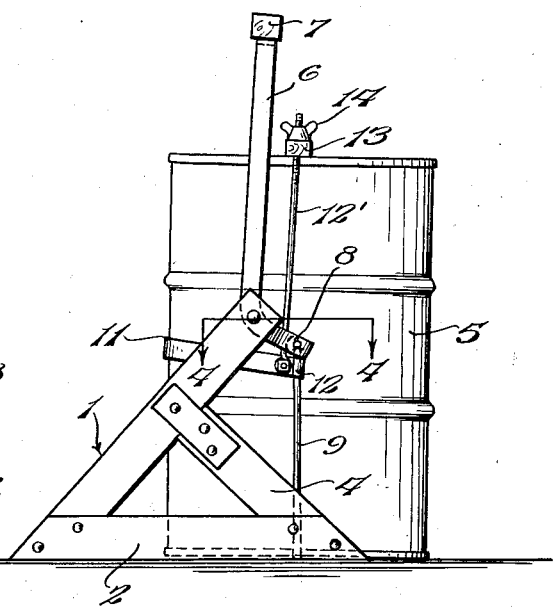
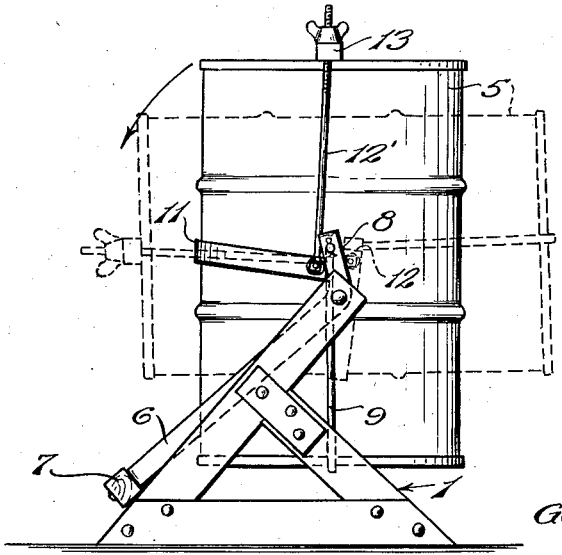
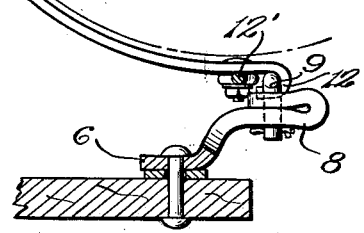
Adolph Larsen
George W. Williams
INVENTORS
BY Victor J. Evans & Co.
ATTORNEY
WITNESS Carman Patented June 9, 1936

2,043,896

UNITED STATES PATENT OFFICE 2,043,896

BARREL JACK

Adolph Larsen and George W. Williams,
Sanish, N. Dak.

Application July 15, 1935, Serial No. 31,474

2 Claims. (Cl. 248—132)

This invention relates to jacks especially adapted for facilitating the handling of barrels and like containers, and has for the primary object the provision of a device of this character which may be readily adapted to a barrel standing on end and is equipped with means so that said barrel may be elevated and sustained free of the ground and free to pivot under manual influence so that said barrel may be tilted to a desired inclination for dispensing its contents with minimum effort on the part of the person.

With these and other objects in view, this invention consists in certain novel features of construction, combination and arrangement of parts to be hereinafter more fully described and claimed.

For a complete understanding of our invention, reference is to be had to the following description and accompanying drawing, in which Figure 1 is a front elevation illustrating a barrel jack constructed in accordance with our invention.

Figure 2 is a side elevation illustrating the same and showing a barrel attached thereto and occupying an upright position upon a supporting surface.

Figure 3 is a similar view to Figure 2, showing the barrel elevated and sustained in said elevated position free for pivotal movement into a dotted line position whereby the contents may be dispensed.

Figure 4 is a detail sectional view taken on the line 4—4 of Figure 2.

Referring in detail to the drawing, the numeral 1 indicates a stand including a base structure 2 with a pair of upwardly inclined supporting members 3 carried thereby and braced, as shown at 4. The base structure is capable of straddling an upstanding barrel or container 5, as shown in the drawing and pivoted to the upper end of the supporting members 3 are levers 6 connected by a handle 7. The pivoted ends of the levers are bent or offset to form arms 8 to which a pair of connecting elements or rods 9 is pivoted. The rods 9 have angularly related ends 10 which engage under the bottom of the barrel or container 5. An arcuately curved strap 11 passes about approximately one-half of the diameter of the barrel or container and has its free ends bent to form eyes 12 to slidably receive the members 9. Rods or members 12' are pivoted to the strap 11 adjacent the eyes 12 and extend upwardly and are connected by a bar 13 which engages with the upper end of the barrel or container. The rods 12 are screw threaded and pass through openings in the bar 13 and have threaded thereon wing nuts 14 whereby the bar 13 may be drawn tightly against the upper end of the barrel or container. The strap 11, members 9 and 12' and bar 13 cooperate in forming a cradle and as the members 9 are pivoted to the arms 8, the cradle is capable of swinging or pivoting so as to position the barrel or container either vertically or in a tilted position, as shown in dotted lines in Figure 3 for dispensing contents therefrom.

After the application of the cradle to the barrel or container, the levers 6 are swung downwardly so that the free ends of the arms 8 pass to one side of the pivots of the cradle to said arms whereby said barrel or container will be supported in an elevated position free for tilting into any desired inclination.

A jack of the character described, renders the handling of barrels or containers comparatively easy. It is usually desirable when not dispensing the contents of a barrel or container to have the latter in an upright or vertical position so that any danger of leakage of the contents by way of the dispensing medium usually employed at the end of the barrel or container will be prevented. With the levers swung to the position shown in Figure 3, the barrel or container is sustained in an elevated position and free to be tilted as desired with minimum effort on the part of the person.

Having described the invention, we claim:

1. A barrel jack comprising a strap adapted to partly encircle a barrel, a pair of tie rods connected to said strap and engaging one end of a barrel, a second pair of tie rods connected to said strap, a bar adjustably secured to said second-named tie rods and engaging the opposite end of the barrel, levers having angularly related ends pivotally connected to the first-named tie rods, and a stand having said levers pivoted thereto.

2. A barrel jack comprising a semicircular shaped strap to partly encircle a barrel and having its ends bent to form hooks, and adjustable means connecting one end of the barrel to said strap, tie rods engaging the other end of the barrel and extending through the hooks and bent angularly to form journals, levers mounted to said journals for pivotal movement, and a stand having the levers pivoted thereto.

ADOLPH LARSEN.
GEORGE W. WILLIAMS.